US009207837B2

(12) United States Patent
Paretti et al.

(10) Patent No.: US 9,207,837 B2
(45) Date of Patent: *Dec. 8, 2015

(54) METHOD, APPARATUS AND COMPUTER PROGRAM PRODUCT FOR PROVIDING MULTIPLE LEVELS OF INTERACTION WITH A PROGRAM

(75) Inventors: Christopher Paretti, San Francisco, CA (US); William Lindmeier, San Francisco, CA (US); Amber Reed, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 63 days.

This patent is subject to a terminal disclaimer.

(21) Appl. No.: 13/331,955

(22) Filed: Dec. 20, 2011

(65) Prior Publication Data

US 2013/0155116 A1     Jun. 20, 2013

(51) Int. Cl.
    *G09G 5/373*      (2006.01)
    *G06F 3/0481*      (2013.01)
    *G09G 5/14*      (2006.01)

(52) U.S. Cl.
CPC .............. *G06F 3/04817* (2013.01); *G09G 5/14* (2013.01); *G09G 2340/0407* (2013.01); *G09G 2340/0414* (2013.01); *G09G 2340/0421* (2013.01); *G09G 2340/145* (2013.01)

(58) Field of Classification Search
None
See application file for complete search history.

(56) References Cited

U.S. PATENT DOCUMENTS

| | | | |
|---|---|---|---|
| 6,724,403 B1 * | 4/2004 | Santoro et al. ................ | 715/765 |
| 7,249,327 B2 | 7/2007 | Nelson et al. | |
| 7,681,134 B1 * | 3/2010 | Grechishkin et al. ......... | 715/740 |
| 7,702,568 B1 | 4/2010 | Tanpoco | |
| 7,933,632 B2 | 4/2011 | Flynt et al. | |
| 2004/0066414 A1 * | 4/2004 | Czerwinski et al. .......... | 345/781 |
| 2005/0091609 A1 | 4/2005 | Matthews et al. | |
| 2006/0143574 A1 | 6/2006 | Ito et al. | |

(Continued)

FOREIGN PATENT DOCUMENTS

EP      1 394 713 A1     3/2004
WO    WO 2010/082950 A1     7/2010

OTHER PUBLICATIONS

Rob (Stackoverflow, "How can I differentiate between single and double clicks in .Net?", "http://stackoverflow.com/questions/218555/how-can-i-differentiate-between-single-and-double-clicks-in-net", Oct. 20, 2008.).*

(Continued)

*Primary Examiner* — Tize Ma
*Assistant Examiner* — Yu Chen
(74) *Attorney, Agent, or Firm* — Alston & Bird LLP

(57) ABSTRACT

Provided herein is a method, apparatus and computer program product for providing multiple levels of interaction with a program. In particular methods of example embodiments may include providing for display of a first representation of a first program, where the first representation includes a first interaction level; providing for display of an intermediate representation in response to receiving a first input, where the intermediate representation comprises an intermediate interaction level; and providing for display of a second representation of the first program in response to a second input, where the second representation includes a second interaction level and the second input is different from the first input. The intermediate representation of the first program may be presented in a size that is larger than the first representation of the first program.

20 Claims, 15 Drawing Sheets

(56) References Cited

U.S. PATENT DOCUMENTS

| | | | |
|---|---|---|---|
| 2006/0242602 A1 | 10/2006 | Schechter et al. | |
| 2007/0082707 A1* | 4/2007 | Flynt et al. | 455/564 |
| 2007/0288860 A1* | 12/2007 | Ording et al. | 715/779 |
| 2008/0086703 A1 | 4/2008 | Flynt et al. | |
| 2008/0201649 A1 | 8/2008 | Mattila et al. | |
| 2008/0270886 A1 | 10/2008 | Gossweiler et al. | |
| 2009/0013275 A1 | 1/2009 | May et al. | |
| 2009/0267909 A1 | 10/2009 | Chen et al. | |
| 2010/0107116 A1 | 4/2010 | Rieman et al. | |
| 2010/0218144 A1 | 8/2010 | Huotari | |
| 2013/0155112 A1 | 6/2013 | Paretti | |
| 2013/0159900 A1 | 6/2013 | Pendharkar | |
| 2014/0281969 A1 | 9/2014 | Kumar | |

OTHER PUBLICATIONS

International Search Report and Written Opinion for Application No. PCT/FI2012/051253 dated Feb. 20, 2013.

Supratim Nayak et al., *Photofold*, Jul. 23, 2011, XP055052921, Retrieved from the Internet: URL: http://dribbble.com/shots/324781-Photofold.

"Animations and Transitions"; Retrieved at <http://msdn.microsoft.com/en-us/library/windows/desktop/aa511285.aspx>>; Retrieved with wayback machine captured date: Sep. 28, 2011.

International Search Report and Written Opinion from International Application No. PCT/FI2012/051269, dated Feb. 19, 2013.

Andy Rathbone, "Windows 7 for Dummies", For Dummies, Sep. 2009, Chapters 3.3 and 3.1, 19 pages.

International Search Report and Written Opinion from International Application No. PCT/FI2012/051274, dated Apr. 23, 2013.

Office Action from U.S. Appl. No. 13/331,975, dated Aug. 5, 2013.

Office Action from U.S. Appl. No. 13/331,975, dated Apr. 7, 2014.

Final Office Action from U.S. Appl. No. 13/331,975, dated Nov. 29, 2013.

Final Office Action from U.S. Appl. No. 13/331,975, dated Jul. 25, 2014.

Office Action from U.S. Appl. No. 13/331,856, dated Jun. 19, 2014.

Office Action from U.S. Appl. No. 13/331,975 dated Jan. 5, 2015.

Office Action for U.S. Appl. No. 13/331,856 dated Oct. 7, 2015.

Office Action for U.S. Appl. No. 13/331,975 dated Jul. 16, 2015.

TemplatedigitalREEL (https://www.youtube.com/watch?v=jPA184olQoA, Unfolding paper 01, youtube posted Feb. 3, 2011) screen capture 2 pages.

\* cited by examiner

METHOD, APPARATUS AND COMPUTER PROGRAM PRODUCT FOR PROVIDING MULTIPLE LEVELS OF INTERACTION WITH A PROGRAM

TECHNOLOGICAL FIELD

Example embodiments of the present invention relate generally to the presentation of information on a display, and more particularly, to a method for providing multiple levels of interaction with a program.

BACKGROUND

Advancements in mobile device technology have developed mobile devices, such as cellular telephones and portable digital assistants (PDAs) that have increased capabilities and provide a user with greater access and control of information. Users may have numerous programs and files available, many of which can be used simultaneously. Some programs may be running while other programs may be dormant, but may be invoked upon user interaction with a representation of the program, such as a tile.

Mobile devices, such as cellular telephones, have become smaller and lighter while also becoming more capable of performing tasks that far exceed a traditional voice call. Mobile devices are becoming small, portable computing devices that are capable of running a variety of programs, some of which benefit from a larger display. These devices are comparable in capabilities to laptop or desktop-type computers such that they can execute thousands of available programs. The portability of such devices may be enhanced by reducing their size, and hence, their display size. The number of programs running or the information to be presented to a user may exceed the capacity of the display. Therefore, optimization of the display area to enhance the user experience may be desirable.

SUMMARY

In general, an example embodiment of the present invention provides a method of presenting multiple levels of interaction with a program. In particular, the method of example embodiments may include providing for display of a first representation of a first program, where the first representation includes a first interaction level with the first program; providing for display of an intermediate representation of the first program in response to receiving a first input, where the intermediate representation comprises an intermediate interaction level with the first program; and providing for display of a second representation of the first program in response to a second input, where the second representation includes a second interaction level with the first program and the second input is different from the first input. The intermediate representation of the first program may be presented in a size that is larger than the first representation of the first program. The second representation of the first program may be presented in a second size that is larger than the size of the intermediate representation.

Methods according to example embodiments may include providing for display of a plurality of first representations of a plurality of other programs concurrently with the display of the first representation of the first program, and repositioning at least one of the plurality of first representations of a plurality of other programs in response to the display of the intermediate representation of the first program. The intermediate interaction level may include a first plurality of discrete interactive elements and the second interaction level may include a second plurality of discrete interactive elements, where the first plurality of discrete interactive elements is a subset of the second plurality of discrete interactive elements. The intermediate interaction level may include a first set of information and the second interaction level may include a second set of information, where the first set of information is a subset of the second set of information. Methods may include providing for display of a first representation of a second program and providing for display of an intermediate representation of the second program including an intermediate interaction level with the second program in response to a third input. The intermediate representation of the second program may be displayed concurrently with the intermediate representation of the first program.

Example embodiments of the invention may provide an apparatus including at least one processor and at least one memory including computer program code. The at least one memory and the computer program code configured to, with the at least one processor, cause the apparatus to provide for display of a first representation of a first program, where the first representation has a first interaction level with the first program; provide for display of an intermediate representation of the first program in response to receiving a first input, where the intermediate representation has an intermediate interaction level with the first program; and provide for display of a second representation of the first program in response to a second input, where the second representation has a second interaction level with the first program and the second input is different than the first input. The intermediate representation of the first program may be presented in a size that is larger than the first representation of the first program. The second representation of the first program may be presented in a second size that is larger than the size of the intermediate representation.

An apparatus according to example embodiments may further be caused to provide for display of a plurality of first representations of a plurality of other programs concurrently with the display of the first representation of the first program, and reposition at least one of the plurality of first representations of a plurality of other programs in response to display of the intermediate representation of the first program. The intermediate interaction level may include a first plurality of discrete interactive elements and the second interaction level may include a second plurality of discrete interactive elements, where the first plurality of discrete interactive elements is a subset of the second plurality of discrete interactive elements. The intermediate interaction level may include a first set of information and the second interaction level may include a second set of information, where the first set of information is a subset of the second set of information. An apparatus according to example embodiments may also be caused to provide for display of a first representation of a second program and provide for display of an intermediate representation of the second program including an intermediate interaction level with the second program in response to a third input. The intermediate representation of the second program may be displayed concurrently with the intermediate representation of the first program.

Embodiments of the present invention may provide a computer program product including at least one non-transitory, computer-readable storage medium having computer executable program code instructions stored therein. The computer executable program code instructions may include program code instructions for providing for display of a first representation of a first program, where the first representation has a first interaction level with the first program; program code instructions for providing for display of an intermediate representation in response to receiving a first input, the intermediate representation including an intermediate interaction level with the first program; and program code instructions for providing for display of a second representation of the first program in response to a second input, where the second representation has a second interaction level with the first program and the second input is different from the first input. The intermediate representation of the first program may be presented in a size that is larger than the first representation of the first program. The second representation of the first program may be presented in a second size that is larger than the size of the intermediate representation.

A computer program product according to example embodiments may further include program code instructions for providing for display of a plurality of first representations of a plurality of other programs concurrent with the display of the first representation of the first program, and program code instructions for repositioning at least one of the plurality of first representations of a plurality of other programs in response to display of the intermediate representation of the first program. The intermediate interaction level may include a first plurality of discrete interactive elements and the second interaction level may include a second plurality of discrete interactive elements, where the first plurality of discrete interactive elements is a subset of the second plurality of discrete interactive elements. The intermediate interaction level may include a first set of information and the second interaction level may include a second set of information, where the first set of information is a subset of the second set of information. A computer program product according to example embodiments may further include program code instructions for providing for display of a first representation of a second program and program code instructions for providing for display of an intermediate representation of the second program including a second interaction level with the second program in response to a third input. The intermediate representation of the second program may be displayed concurrently with the intermediate representation of the first program.

Example embodiments of the invention may provide an apparatus including means for providing for display of a first representation of a first program, where the first representation has a first interaction level with the first program; means for providing for display of an intermediate representation in response to receiving a first input, where the intermediate representation has an intermediate interaction level with the first program; and means for providing for display of a second representation of the first program in response to a second input, where the second representation has a second interaction level with the first program and the second input is different than the first input. The intermediate representation of the first program may be presented in a size that is larger than the first representation of the first program. The second representation of the first program may be presented in a second size that is larger than the size of the intermediate representation.

An apparatus according to example embodiments may further include means for providing for display of a plurality of first representations of a plurality of other programs concurrently with the display of the first representation of the first program, and means for repositioning at least one of the plurality of first representations of a plurality of other programs in response to display of the intermediate representation of the first program. The intermediate interaction level may include a first plurality of discrete interactive elements and the second interaction level may include a second plurality of discrete interactive elements, where the first plurality of discrete interactive elements is a subset of the second plurality of discrete interactive elements. The intermediate interaction level may include a first set of information and the second interaction level may include a second set of information, where the first set of information is a subset of the second set of information. An apparatus according to example embodiments may also include means for providing for display of a first representation of a second program and means for providing for display of an intermediate representation of the second program including an intermediate interaction level with the second program in response to a third input. The intermediate representation of the second program may be displayed concurrently with the intermediate representation of the first program.

BRIEF DESCRIPTION OF THE SEVERAL VIEWS OF THE DRAWINGS

Figure 1:
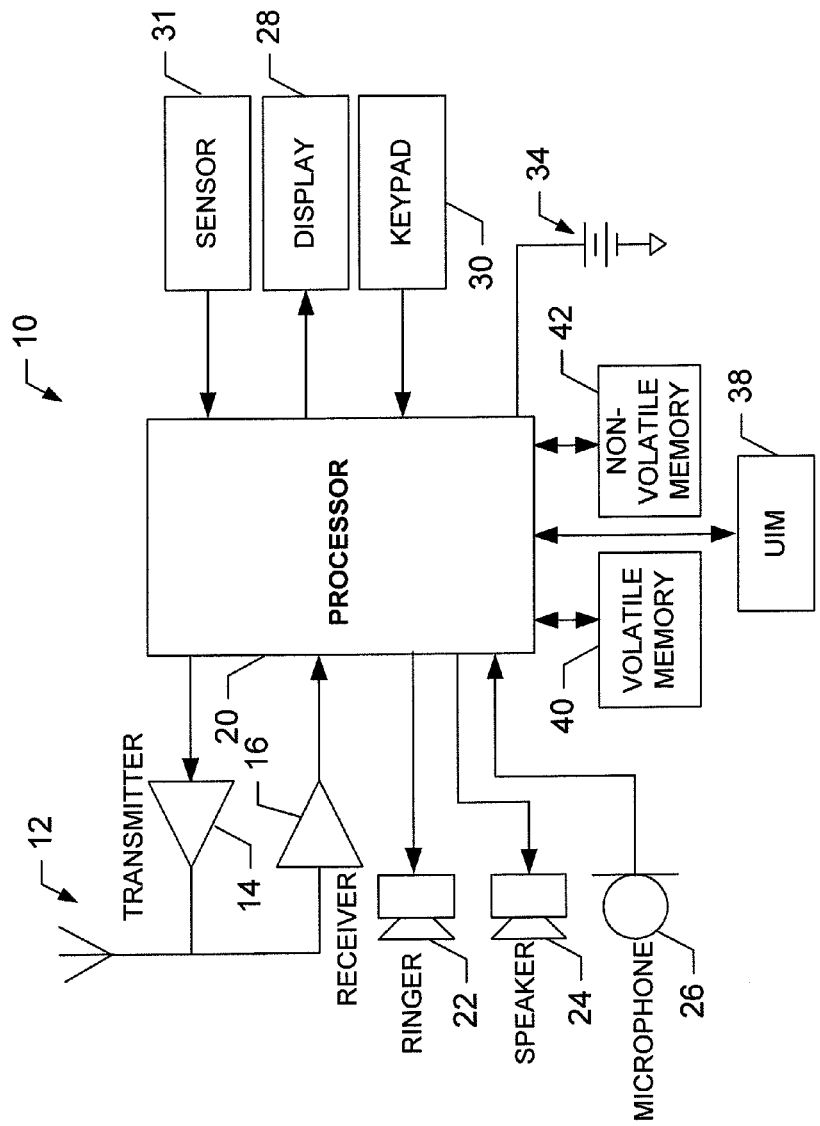
Figure 2:
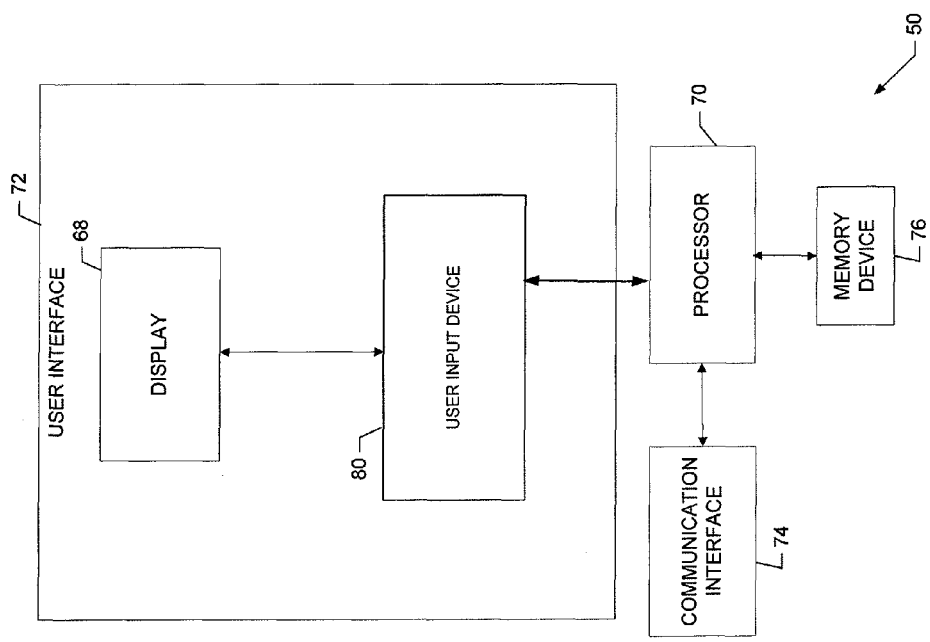
Figure 3:
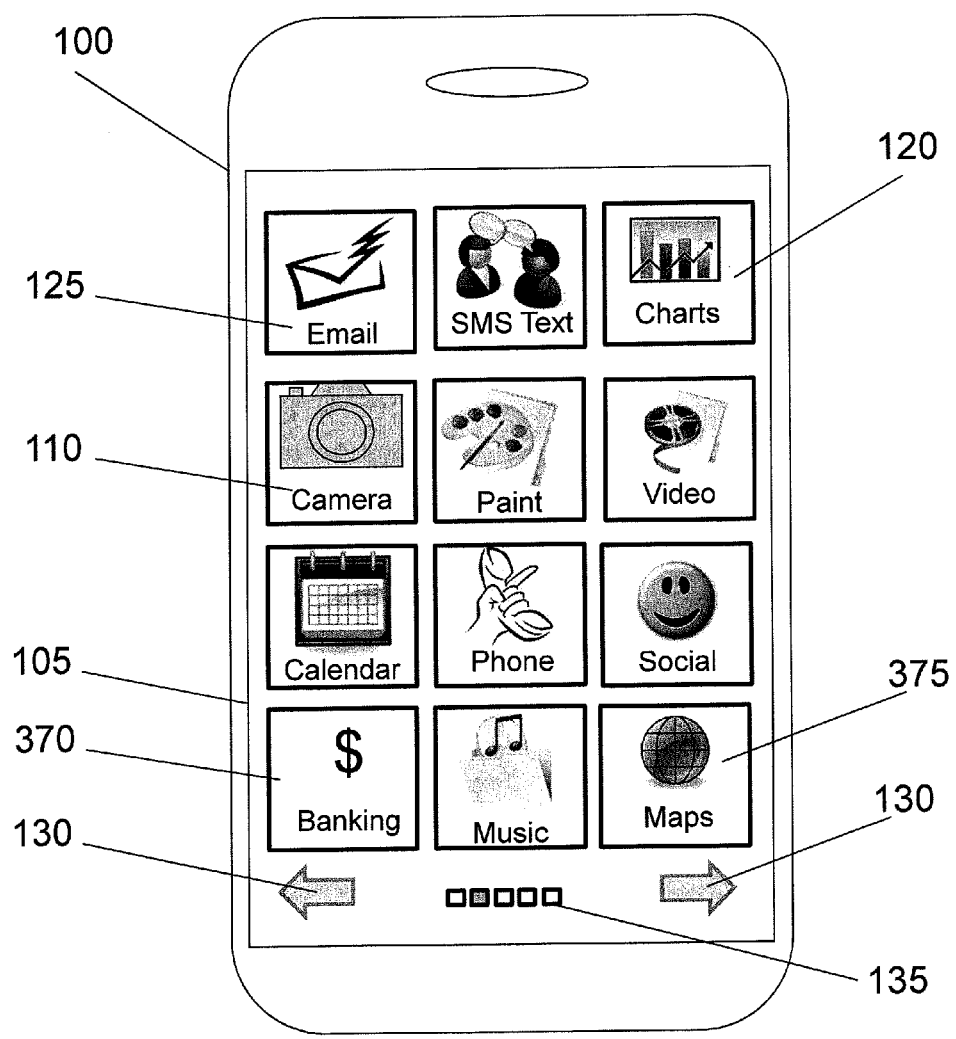
Figure 4:
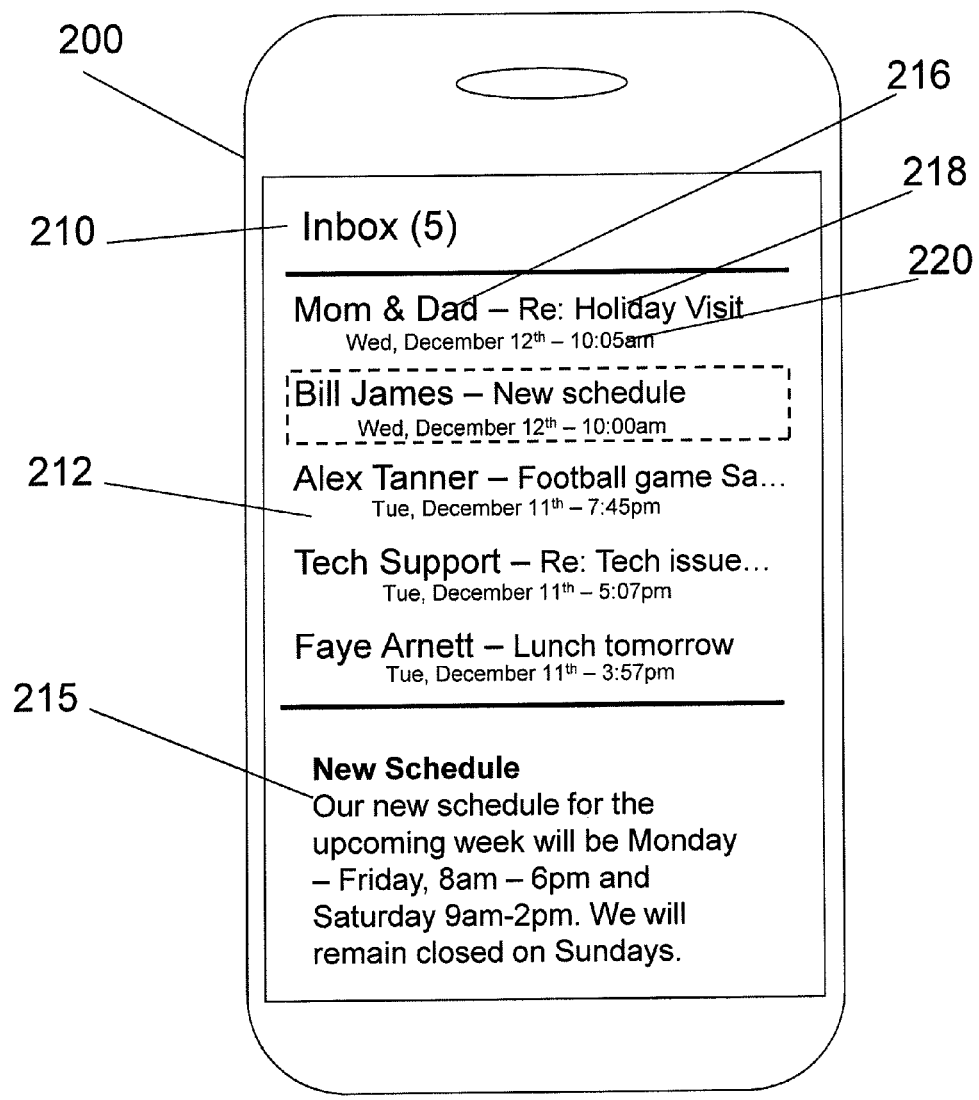
Figure 5:
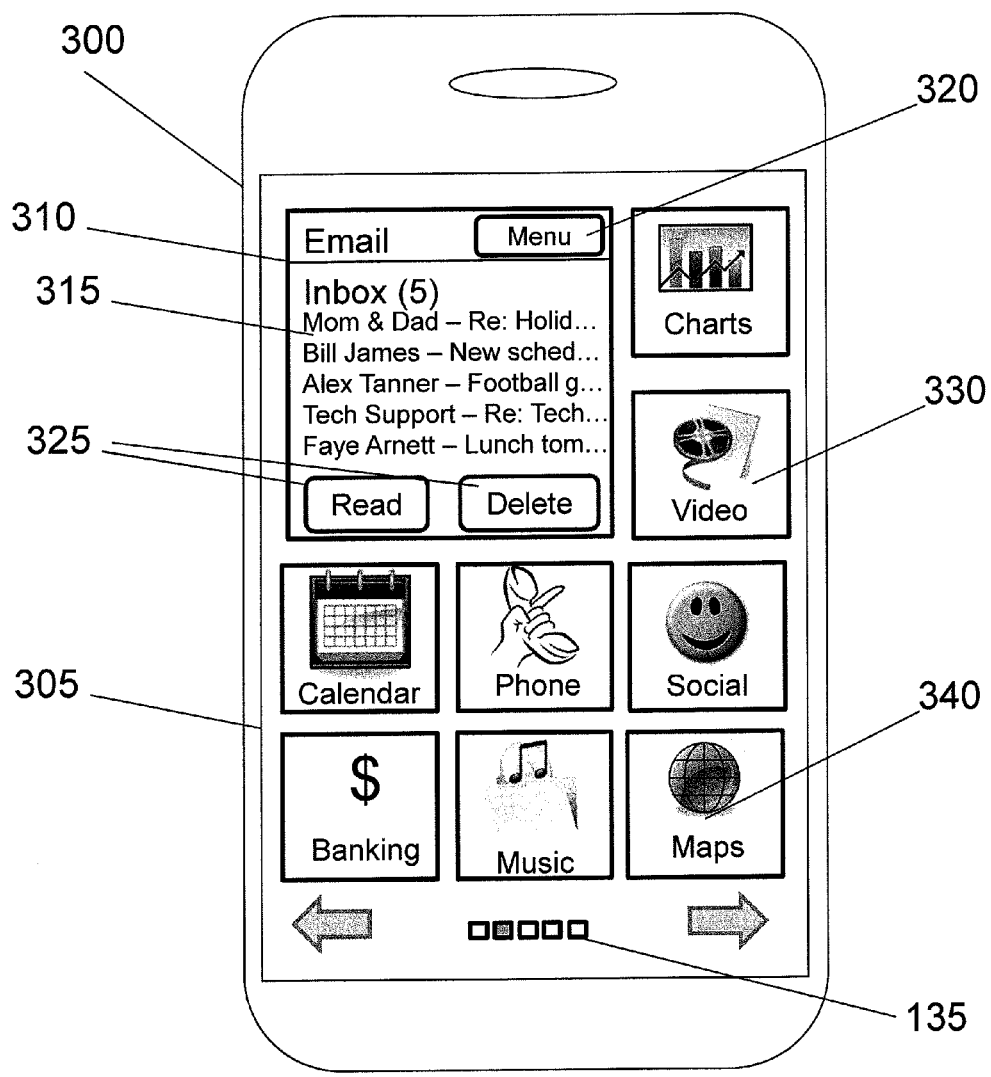
Figure 6:
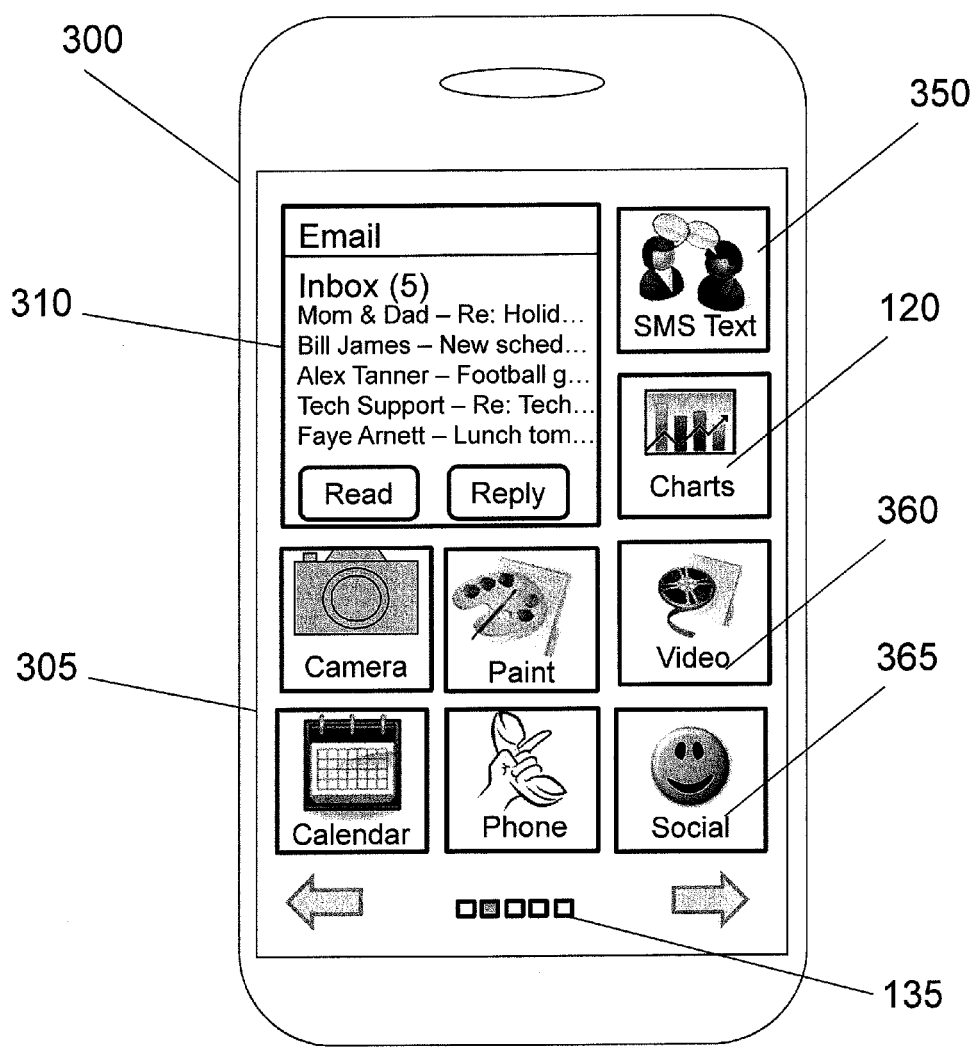
Figure 7:
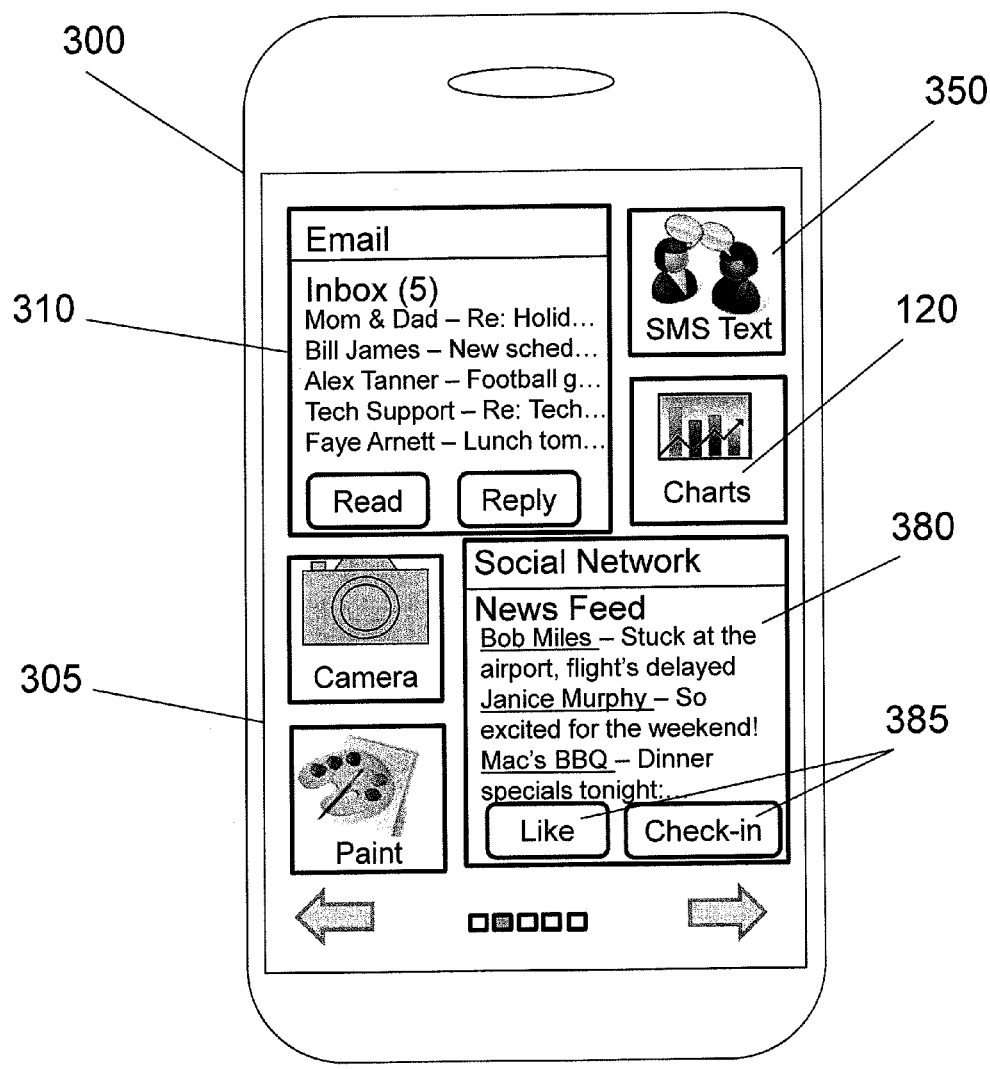
Figure 8:
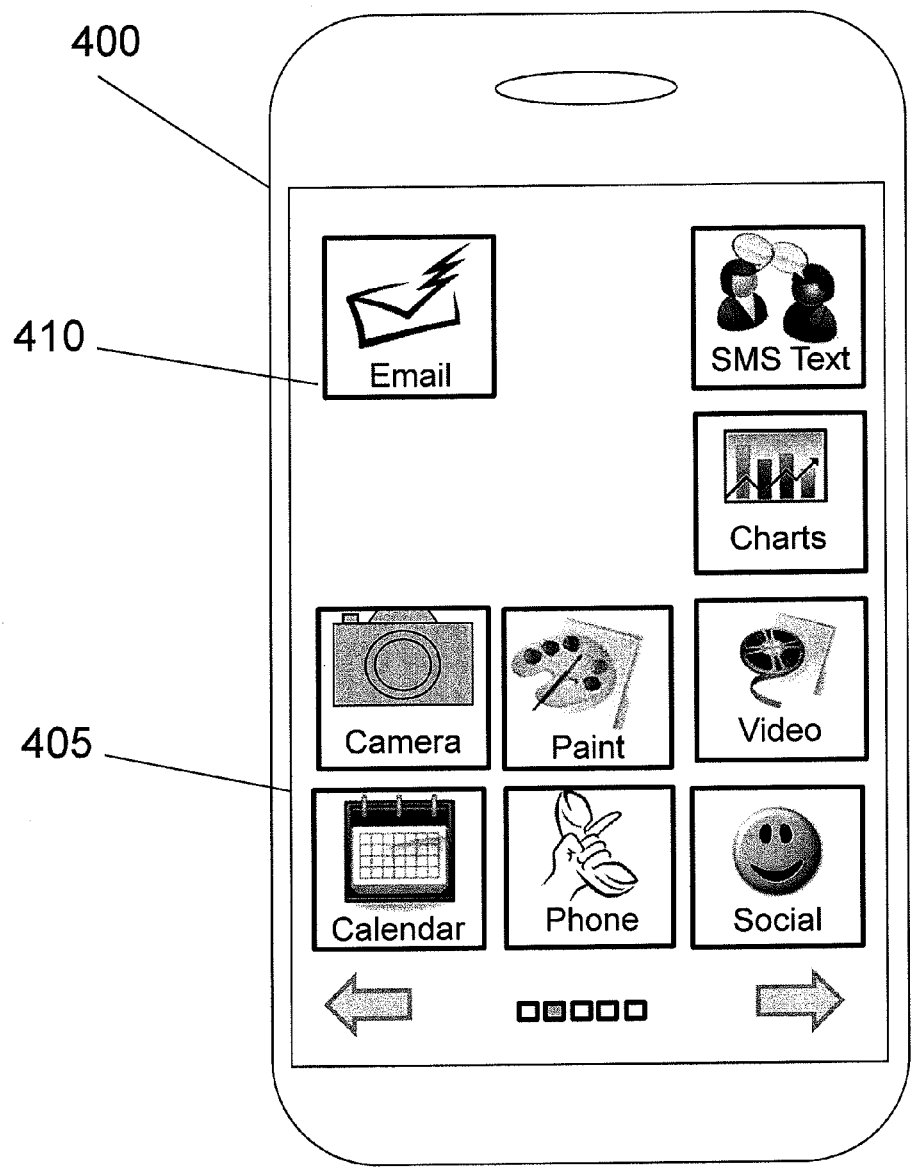
Figure 9:
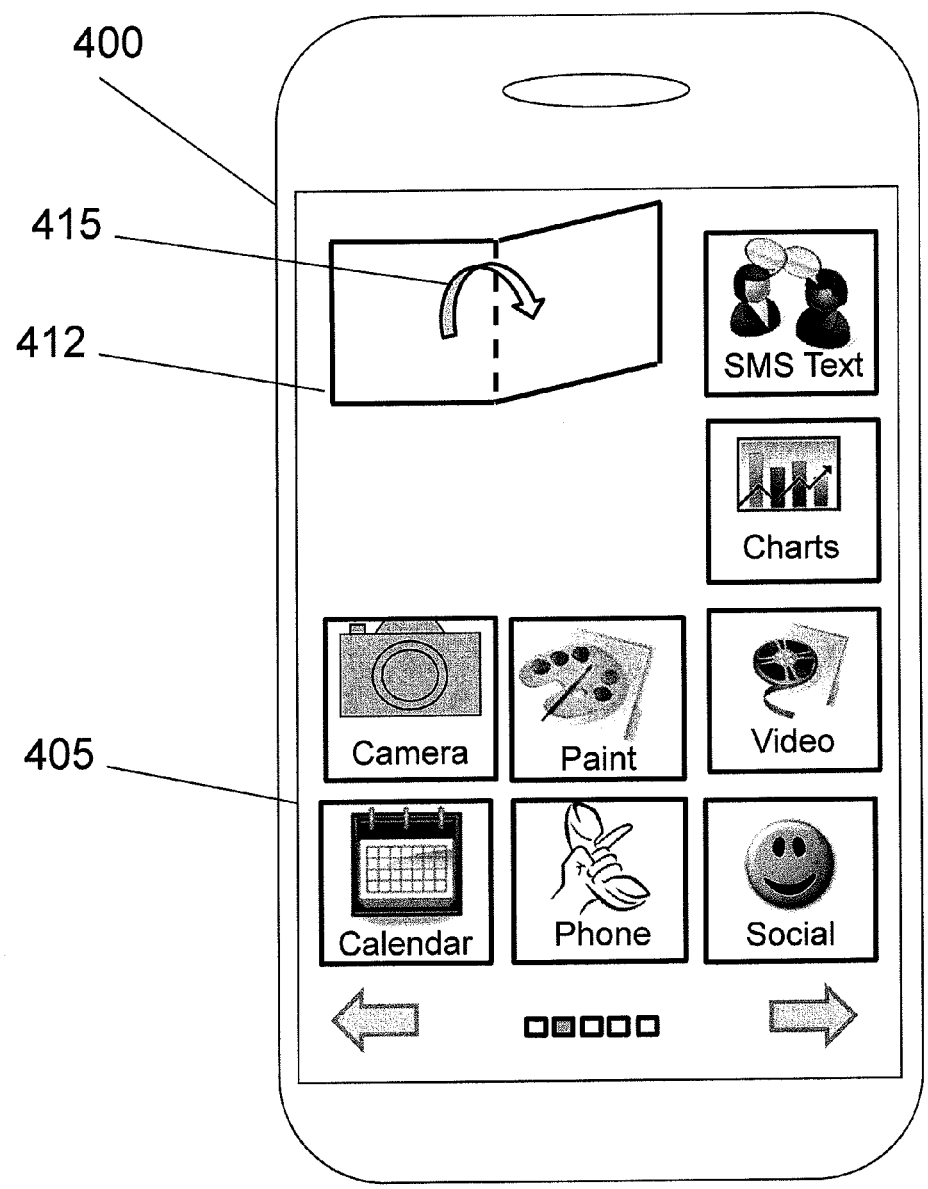
Figure 10:
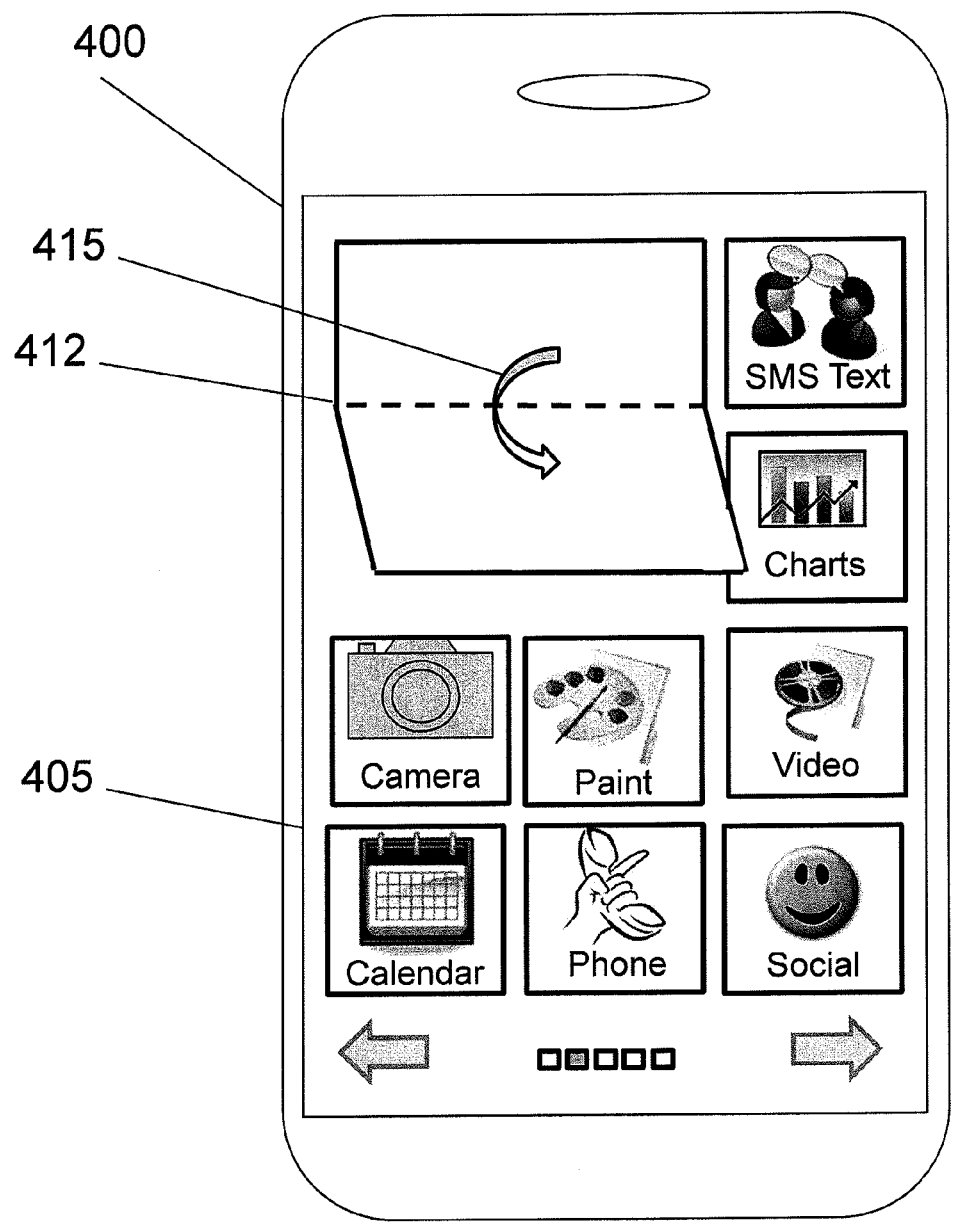
Figure 11:
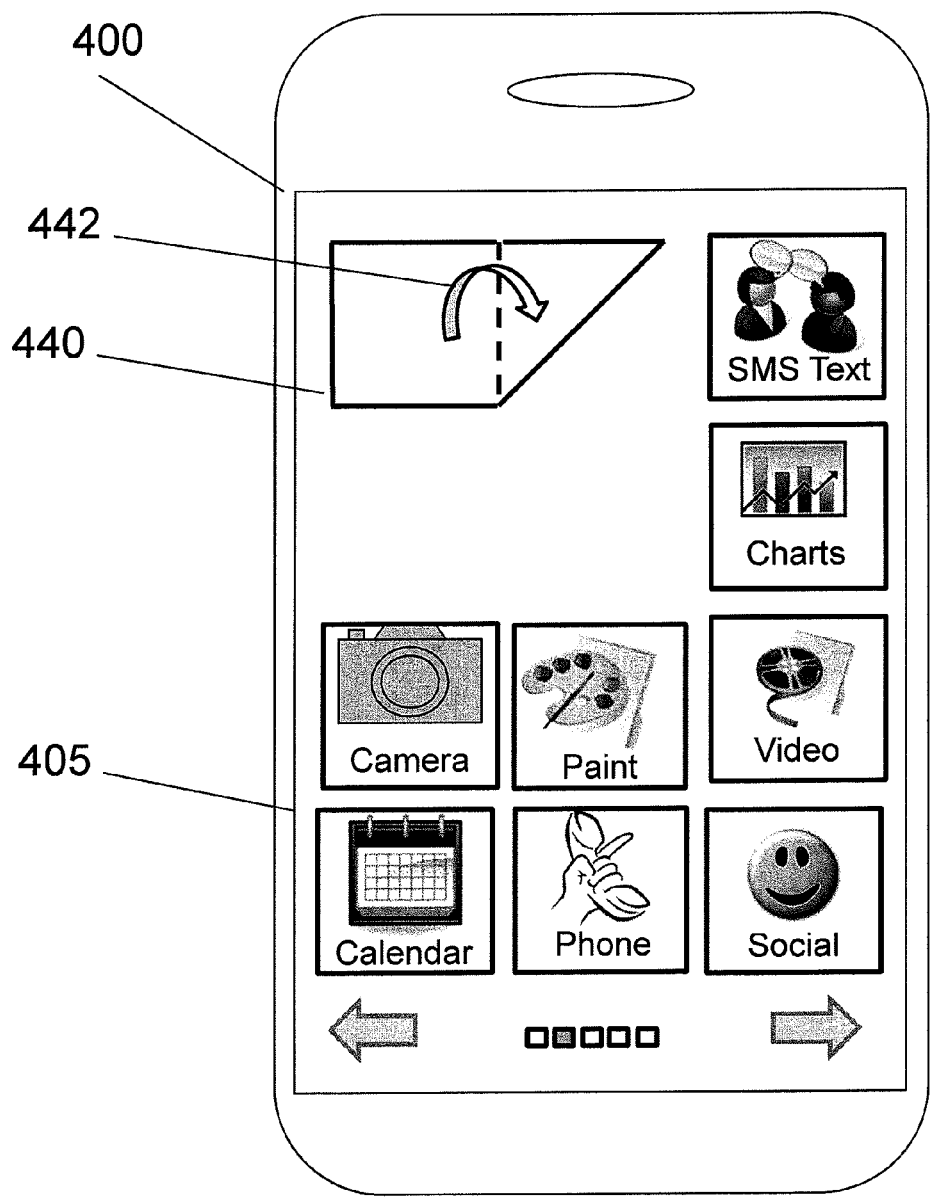
Figure 12:
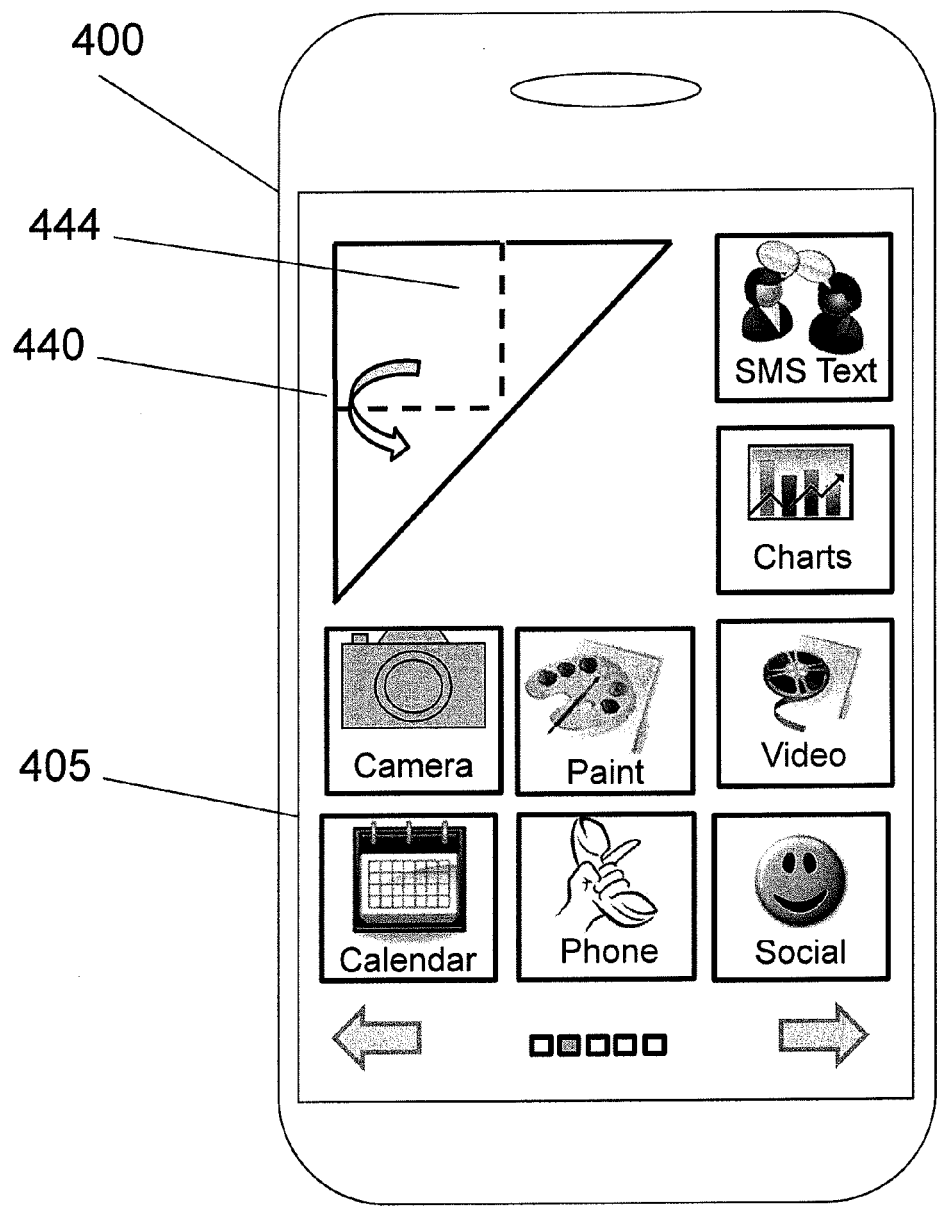
Figure 13:
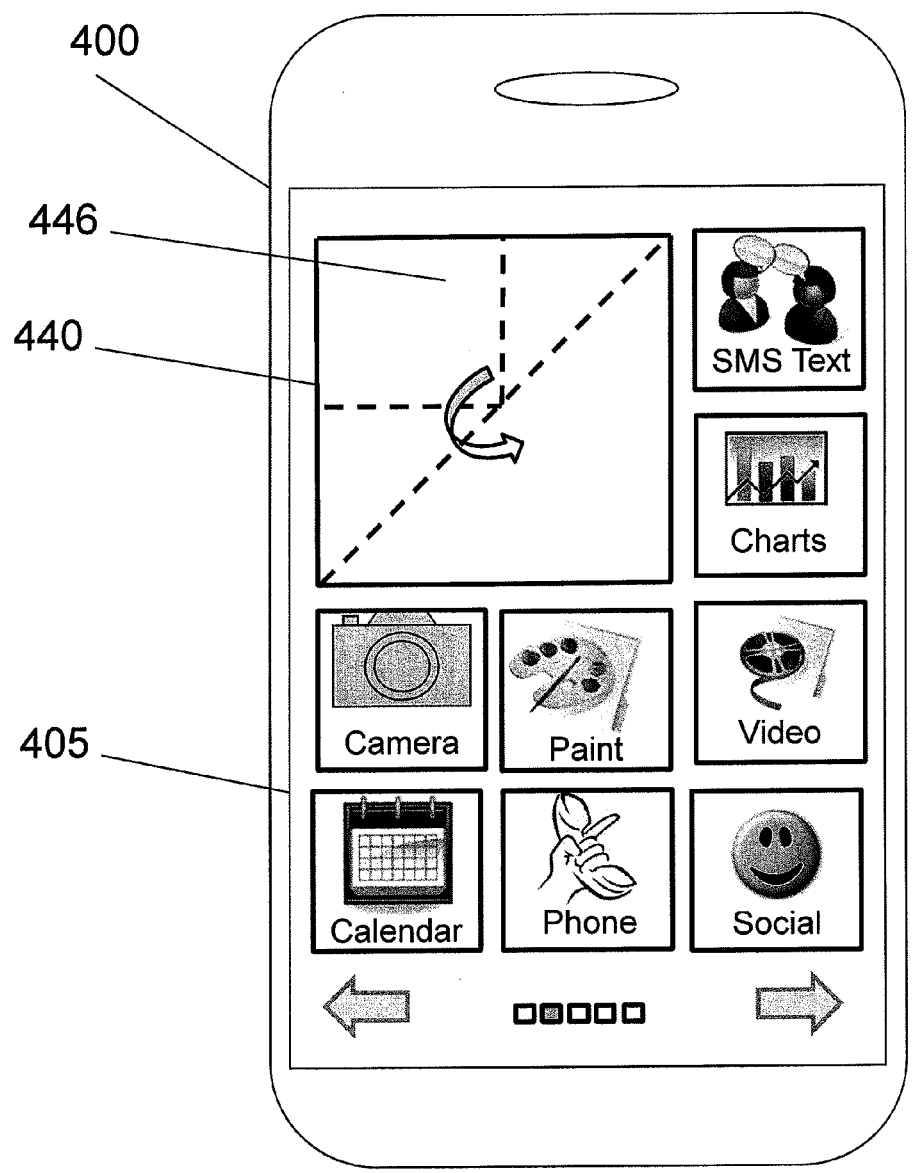
Figure 14:
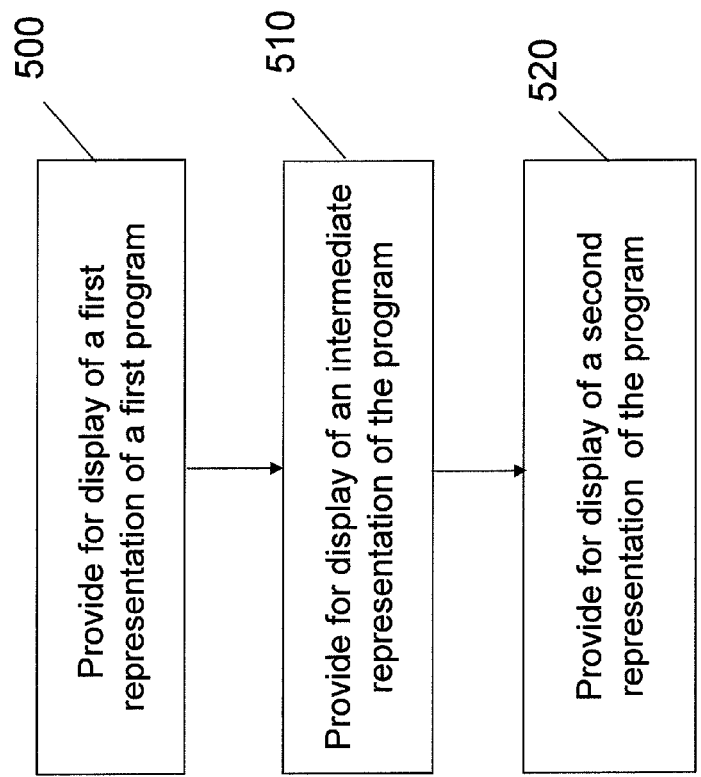
Figure 15:
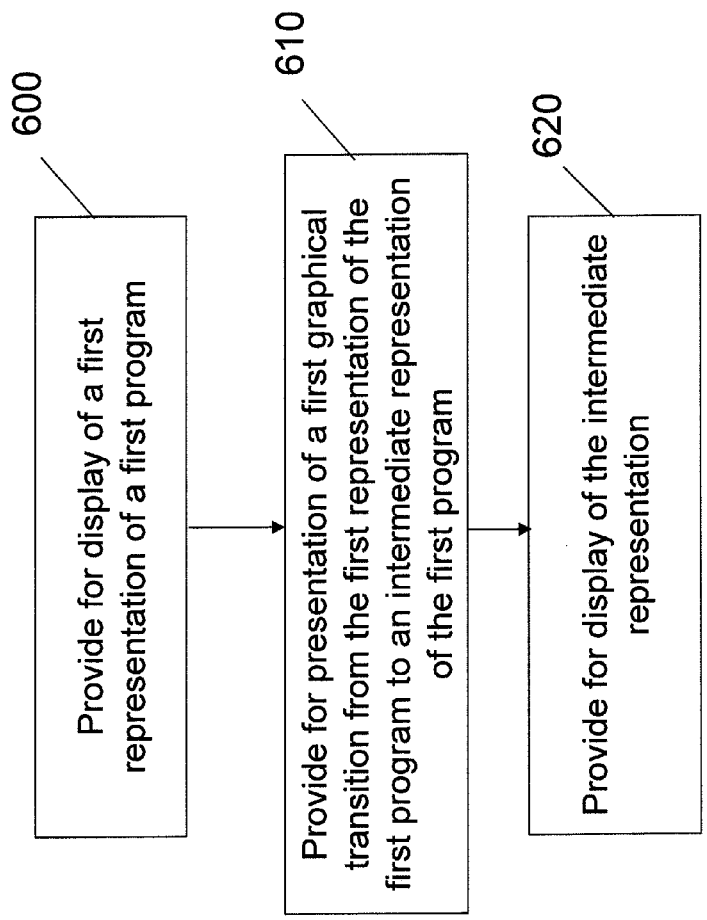

Having thus described embodiments of the invention in general terms, reference will now be made to the accompanying drawings, which are not necessarily drawn to scale, and wherein:

FIG. 1 is a schematic block diagram of a mobile terminal according to an example embodiment of the present invention;

FIG. 2 is a schematic block diagram of an apparatus for providing a multiple levels of interaction with a program according to an example embodiment of the present invention;

FIG. 3 is an illustration of a device displaying a program menu;

FIG. 4 is an illustration of a device displaying a program;

FIG. 5 is an illustration of a device presenting an intermediate representation of a program according to an example embodiment of the present invention;

FIG. 6 is an illustration of a device presenting an intermediate representation of a program according to another example embodiment of the present invention;

FIG. 7 is an illustration of a device presenting intermediate representations of two programs according to an example embodiment of the present invention;

FIG. 8 is an illustration of a device having repositioned first representations of programs according to an example embodiment of the present invention;

FIGS. 9 and 10 are illustrations of a sequence of operations of a device presenting a graphical transition between a first representation of a program and an intermediate representation of the program according to an example embodiment of the present invention;

FIGS. 11-13 are illustrations of a sequence of operations of a device presenting another graphical transition between first representation of a program and an intermediate representation of the program according to an example embodiment of the present invention;

FIG. 14 is a flowchart of the operations for presenting an intermediate representation of a program according to an example embodiment of the present invention; and FIG. 15 is a flowchart of the operations for presenting a graphical transition between a first representation of a program and an intermediate representation of the program.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Devices that may benefit from example embodiments of the present invention may include portable devices, such as tablet computers, cellular telephones, portable media devices, or the like, which are enhanced by a graphical user interface presented on a display, such as a touch screen. As portability of these devices often relates to their size, a smaller size may enhance portability while potentially sacrificing the available display area. Therefore it may be desirable to optimize the display to present additional information in an easily intelligible manner while providing multiple levels of interface with available programs. As noted below, the device of other embodiments may be a fixed or non-mobile.

Some embodiments of the present invention may relate to a provision of a mechanism by which the user interface is enhanced by providing multiple levels of interaction with a program. A program may be presented in a first representation including a first interaction level which may be a relatively low interaction level available when the program is not running and is available only as an icon or tile from which the program may be launched. The program may also be presented in a second representation having a second interaction level which may be a relatively high interaction level such as an interaction level of a running program. Further, the program may also be presented in an intermediate representation having an intermediate interaction level, where the intermediate interaction level is higher than the first interaction level, but lower than the second interaction level. The intermediate representation may be presented in response to an input, such as at the first representation of the program. The term "interaction level" or "level of interaction" refers to the information presented to a user as well as operations available to a user as will be described further below. A higher level of interaction indicates more information presented to a user and/or more operations or interactive elements available to a user.

Some embodiments of the present invention may relate to a provision of a mechanism by which the user interface is enhanced by including a graphical transition between the first representation of a program and the intermediate representation of the program, between the intermediate representation and the second representation of the program, and/or between the first representation of the program and the second representation of the program. The graphical transition may provide a visual cue indicative of the relationship between the first representation of the program and the intermediate representation of the program or the representations between which the graphical transition is presented. The graphical transition may resemble a physical manipulation of a tangible object, such as the unfolding of a piece of paper.

One example embodiment of the invention is depicted in FIG. 1 which illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Additional input to the processor 20 may include a sensor 31. The sensor 31 may include one or more of a motion sensor, temperature sensor, light sensor, accelerometer, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

As noted above, mobile terminals, including devices such as portable digital assistants (PDAs) and cellular telephones, are becoming smaller in size to allow for greater portability to the user. With the decrease in size of such devices, however, comes a decrease in the space available for displaying information. In other words, the size of the viewing area through which interactive content (e.g., contacts, e-mail messages, games, etc.) is presented to the user has become more limited as a result of more compact devices.

An example embodiment of the present invention will now be described with reference to FIG. 2, in which certain elements of an apparatus 50 for providing a mechanism by which relevant content may be determined and/or presented are illustrated. The apparatus 50 of FIG. 2 may be embodied by a device such as mobile terminal 10 of FIG. 1. However, it should be noted that other embodiments of the present invention may be embodied on any number of devices. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The apparatus 50 of FIG. 2 includes a processor 70 that may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display, such as the illustrated display 68. In different example cases, the display 68 may include a touch screen display which may be a two dimensional (2D) or three dimensional (3D) display. Thus, for example, a touch screen display could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with a touch screen display to receive indications of user inputs at the touch screen display and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector, or where a cursor is used to direct input on the display).

In an example embodiment, the apparatus 50 may include a user input device 80, such as a keypad, a track-ball, a mouse, or the user input device may be embodied with the display 68 as a touch screen display. The user input device 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of an input received at the user input device 80 as described herein. Thus, in examples in which software is employed, a device or circuitry (e.g., the processor 70 in one example) executing the software forms the structure associated with such means.

In example embodiments where the display 68 is a touch screen display, user input device 80 may be configured to receive an indication of an input in the form of a touch event at the display 68. As such, the user input device 80 may be in communication with the display 68 to receive indications of user inputs at the display 68 and to modify a response to such indications based on corresponding user actions that may be inferred or otherwise determined responsive to the indications.

FIG. 3 illustrates a device 100 for providing a mechanism by which multiple levels of interaction with a program may be presented to a user. The term "program" as described herein can refer to any application or program of a device, such as a media player program, an email program, an Internet browser, a device settings manager, or a media library, among many others. As such, the term "program" should not be limited to the embodiments described herein with regard to the example illustrations as any number of functions of a device may be considered a "program."

FIG. 3 depicts a device, such as a mobile device (e.g., mobile terminal 10), that includes a display 105. The display may be of any type of display including touch-screen displays; however, the touch-screen functionality is not necessary to implement example embodiments of the present invention. Depicted on the display 105 is a list of programs presented in a first representation. The illustrated embodiment presents the first representation as tiles (e.g., tiles 110, 120) in a program list or menu; however, the first representation may include presentation of the program in a variety of possible representations including tiles, icons, text (e.g., a list of programs), widgets (e.g., an interactive tile), or the like. While the illustrated embodiment includes tiles (110, 120, etc.) which include a border and regular shapes, embodiments may also include tiles without borders and/or regular shapes. In example embodiments of the first representation comprising tiles, the tiles may include illustrative figures or symbols indicating to a user a program or other information associated with the tile. For example, a tile representing a camera program 110 may include a graphical representation of a camera, while a tile representing a spreadsheet program 120 may include a graphical representation of a spreadsheet or graph. Tiles may also be representations of data, such as a particular multimedia file, a contact, or a particular spreadsheet, for example. Optionally, the tiles may further include names or nicknames adjacent to them indicating to which program or file each tile is associated. Such text names may be beneficial in providing additional information to the user regarding what the tile represents, for example when multiple email or music player programs are available, or when the device includes a large number of programs.

The first representation of a program, such as a tile 110 or 120 of FIG. 3 may include a first interaction level. As noted above, the interaction level may refer to the information presented to a user as well as operations available to a user. In the illustrated embodiment of FIG. 3, the first representation of a program comprising a tile may include a first interaction level which is relatively low. For example, the interaction level of a tile may be limited to launching the program that is represented by the tile, moving the tile, or possibly updating or removing (e.g., uninstalling) the program from the device (e.g., from the memory 76). This level of interaction may be relatively low when compared with the interaction level available from a program that is running at full capacity.

The display 105 of the device 100 may further include arrows 130 or other indications alerting a user that more programs beyond those for which first representations are currently presented may exist on the program list or menu, each of which may be accessible through scrolling, panning, or by switching to another "page" on which programs may be presented. The display 105 may further include a page indicator 135 to indicate to a user which page, of available pages that the user is viewing. In the illustrated example, the user is viewing the second page of five available pages, with an indication that one page is available to the left while three pages are available to the right. Upon selection of a first representation of a program (e.g., by selecting a tile representing the program through an input, such as the user interface 72), the program is launched (e.g., by the processor 70) and a second representation of the program may be presented. FIG. 4 depicts an example embodiment of a second representation of an email program which has been launched from the program menu where the email program is running at full capacity. The second representation of the email program may include a second interaction level that is higher than the interaction level of the first representation of the program (e.g., tile 125 of FIG. 3). The amount of information presented to a user and the operations available to the user of the second representation of the email program including the second interaction level are greater than the amount of information presented to the user and the operations available to the user of the first representation of the email program.

The second representation comprising the second interaction level may provide operations that may be represented by interactive elements such as menu functions, buttons, keys, virtual keys, and the ability to select objects, such as a song from a list or an email from a mailbox. The second interaction level may offer substantially all available interactive elements of the program while also requiring the most processing capacity to allow these functions to be performed and to provide the most interactive graphical user interface (GUI).

The operations available to the user through the second representation including the second interaction level may be greater than the operations available to the user through the first representation including the first interaction level. The second representation of the email program as illustrated in FIG. 4 may present a header 210 which indicates the folder that the user is viewing, a list of recent emails received 212, and a preview pane 215 which displays the body of a selected email. In such an embodiment, the second representation of the program may occupy the entire display, or a significant portion thereof such that other programs may not be visible or directly accessible. Interactive elements may be available through menus or presented upon selection of a displayed interactive element. For example, upon selection of a particular email from the email list 212 (e.g., through an input received at the user interface 72), the user may be presented with a plurality of discrete interactive elements such as interactive elements that provide options for replying to an email, forwarding an email, filing an email, opening an attachment, cutting/pasting text, changing the folder viewed, deleting emails, sending to a printer, or otherwise interacting with the program within the second interaction level.

In addition to the interactive elements that are available within the second interaction level of the email program depicted in FIG. 4, the information presented may be greater than that of the first interaction level. For example, with regard to the email list 212, each email may be presented with a sender 216, a subject 218, a date and time received 220, and the body of the email may be previewed in the preview pane 215.

While the second interaction level may provide a higher level of interaction with a program relative to the first interaction level, such as a fully functional interaction level with a program running at full capacity, the second interaction level may also provide interactive elements that are seldom used or may not be required by a user during a brief interaction with the program. Further, the second interaction level may consume processing capacity of the processor 70 and memory from memory device 76 that may slow the performance of a device (e.g., apparatus 50) and/or may more rapidly drain power from the battery than when the program is provided in the first representation with a first interaction level. Therefore, it may be desirable to provide an intermediate representation including an intermediate interaction level with a program that offers an interaction level that is less than the second interaction level of the program, but greater than the first interaction level of the program. The intermediate interaction level may provide a useful interaction level for a user which may include commonly used interactive elements and/or a mechanism to interact with a program without launching the program to the second representation including the second interaction level.

FIG. 5 illustrates an example embodiment of the present invention in which a program has been opened to an intermediate representation 310 including an intermediate interaction level 310. The intermediate representation 310 may be presented in an area larger than the first representation which represented the application (e.g., tile 125 of FIG. 3). The intermediate representation 310 may include an intermediate interaction level that is greater than the first interaction level of the first representation (e.g., a tile representing the application) and less than the second interaction level of the second representation of the program (e.g., a program running at full capacity). For example, in the illustrated embodiment, the intermediate representation 310 may include an intermediate interaction level which includes interactive elements such as a list of recently received emails 315, a menu button or virtual key 320, and action option keys 325. In an example embodiment, the interactive elements found under the menu key 320 may include input options to archive emails, close the intermediate interaction representation (e.g., return the program to the first representation), or launch the second representation of the program, among other options. While the intermediate representation provides an intermediate interaction level with the email program, the intermediate interaction level may not provide the level of interaction available with the second interaction level of the program.

The intermediate representation 310 including the intermediate interaction level may consume less processing capacity from processor 70, occupy less memory from memory 76, and may also draw less power from the battery than the second representation including the second interaction level of the program. The intermediate representation including the intermediate interaction level may therefore operate more quickly than the second representation including the second interaction level of the program. Further, the most commonly used interactive elements of the program may be available in the intermediate interaction level such that the intermediate interaction level may be used in place of the second interaction level of the program for relatively non-complex, common functions, such as reading recent emails. In the illustrated embodiment including an email program operating in an intermediate representation including an intermediate interaction level, the relatively non-complex, common functions may include such interactive elements as "read" and "delete" among others. Example embodiments of interactive elements that may not be available may include "reply" or "open attachment" as these interactive elements may require more area on the display or more processing capacity than is allotted the intermediate representation and the intermediate interaction level. However, it is appreciated that any interactive elements may be available to a user short of the full complement provided in the second interaction level of the program according to embodiments of the present invention. The aforementioned examples are merely possible interactive elements to include or exclude from the intermediate interaction level.

The displayed intermediate representation 310 of FIG. 5 is further depicted to occupy the space previously occupied by four tiles representing programs or files. The size of the intermediate representation 310 presented may be of any size, but is generally smaller than the display 305 size in order to not monopolize the display 305. As illustrated, when the intermediate representation 310 is displayed, tiles representing other programs (e.g., 330, 340) may still be displayed. In the illustrated embodiment of FIG. 5, the intermediate representation 310 overlies previously displayed tiles shown in FIG. 3. The tiles representing the video program 330 and the map program 340 may still be accessed to initiate the second representation or an intermediate representation of each respective program while the first representations of other programs (e.g., tile 110) that were substantially obscured by the displayed intermediate representation 310 may not be readily available.

FIG. 6 illustrates a display having tiles representative of the same programs as in FIGS. 3 and 5; however, the tiles representing other programs (e.g., tiles 350, 120, 360, etc.) have been re-positioned on the display 305 in response to one of the programs, e.g., the email program, opening to an intermediate representation 310. As illustrated and with reference to FIG. 3, the tile representing the text messaging program 350 has been moved such that the displayed intermediate representation 310 does not obscure the tile 350. Further, the tile representing the chart program 120 has also been repositioned as the tile representing the text messaging program 350 has displaced the chart program tile 120. Similarly, the tile representing the video program 360 and the tile representing the social networking program 365 have been moved down the display 305. The tiles representing the banking program 370 and the map program 375 have been dropped from the display 305 by virtue of the other tiles being repositioned. Optionally, the tiles could be resized (e.g., reduced in size) in order to accommodate the intermediate representation while still displaying all of the tiles shown in the original program menu of FIG. 3.

The tiles that are repositioned may be repositioned according to a hierarchy or order that is determined by the user or by the device 300 itself (e.g., via processor 70). For example, a user may select their favorite programs and rank them from most important to least important. The most important programs may be represented by tiles closest to the top of the display while the least important programs are presented proximate the bottom of the display. In response to tiles being repositioned, the tiles representing the least important programs may be displaced from the display. Optionally, the device may determine (e.g., via processor 70) the most frequently used programs and maintain the tiles representative of the most frequently used programs closest to the top of the display 305 such that the tiles near the bottom of the display that are displaced represent less frequently used programs.

Further example embodiments of the present invention may include hierarchies that are predictive or based upon device awareness. For example, a device according to embodiments of the present invention may include a calendar program in which a user may store scheduled meetings or appointments. A meeting or appointment scheduled within the calendar program may be scheduled as a video-conference with an agenda for the meeting attached to the appointment as a spreadsheet. The device may be configured with a first hierarchy which organizes program tiles in alphabetical order. At the time of the scheduled meeting, or a predefined amount of time before the scheduled meeting, the processor 70 of the device may be caused to switch to a second hierarchy in response to the anticipated meeting without user intervention, thereby organizing the tiles representing programs according to those that are anticipated for use during the scheduled meeting. In the instant example, the hierarchy may present a video-conference program tile first, a spreadsheet program tile second, and subsequently list the remaining program tiles by the first hierarchy (e.g., alphabetically).

While the illustrated embodiments of FIGS. 5 and 6 depict the displayed intermediate representation of the program 310 disposed in the upper left corner of the display, the position of the displayed intermediate representation may be determined by the original location of the first representation of the program or a preferred location on the display where an intermediate representation may be most accessible (e.g., proximate the middle of the display 305). For example, a tile in the lower right corner of the display may be opened to an intermediate representation including an intermediate interaction level that is presented in the lower right corner of the display. FIG. 7 illustrates the example embodiment of FIG. 6 with the tile representing the social networking program 365 opened to an intermediate representation 380 including an intermediate interaction level presented in the lower right corner of the display 305. In the illustrated embodiment, the social networking program intermediate interaction level provides limited interactive elements 385 for an interaction level that is greater than that of the first representation having a first interaction level, but less than that of a second representation having a second interaction level. Further, as illustrated, an advantage of intermediate representation having an intermediate interaction level may include that multiple intermediate representations 310, 380 may be presented on the display 305 simultaneously. As the intermediate representations include intermediate interaction levels that consume less processing capacity and memory, the processing capabilities of the device 300 may not be significantly affected by multiple instances of intermediate representations running as they would by multiple instances of programs at full capacity running with second interaction levels.

While intermediate interaction levels may be desirable to a user who does not desire to use the interactive elements available in the second interaction level of the program, the second interaction level of the program may be desirable to users who wish to use an a greater interaction level (and interactive elements) not available with the intermediate interaction level. Therefore a user may be able to decide whether to open the intermediate representation or the second representation of a program from the program menu depicting first representations of programs in FIG. 3. A user may initiate an intermediate representation including an intermediate interaction level of a program using a first input received, for example, at user interface 72, while a second input, different from the first may initiate the second representation of a program. For example, in an embodiment implementing a touch-screen display (e.g., display 68 of user interface 72), a single tap of a first representation of a program may launch an intermediate representation of the program. A double-tap of the first representation of a program may launch the second representation of the program, where a double-tap may be interpreted by two sequential taps of the display over the first representation of the program within a predetermined amount of time (e.g., one second or less). Alternatively, a first input may include a tap (e.g., momentary touch) while a second input includes a long press (e.g., a touch of a minimum duration, such as half of a second). Further, the inputs received may include a direction, such that a touch including a swipe to the upper right corner of a display (e.g., display 68) may be indicative of a first input, while a touch including a swipe to the lower left corner of the display may be indicative of a second input. Further, a user may be able to transition from the intermediate representation to the second representation of the program in response to another input, such as an input received within the intermediate representation.

The program may be capable of transitioning directly between any one of a first representation including a first interaction level, an intermediate representation including an intermediate interaction level, and a second representation including a second interaction level in response to a particular input configured to effect such a transition.

As detailed above, opening a program to an intermediate representation may cause first representations of other programs or files to be repositioned, be obscured by the intermediate representation, or to be dropped from the display. As such, it may not be abundantly clear to a user which program has been opened to the intermediate representation, particularly when the displayed intermediate representation of multiple programs may resemble one another. As a user may inadvertently open the incorrect program or interact with different intermediate representations differently, it may be desirable to have a visual cue to clarify the first representation from which an intermediate representation was launched.

Example embodiments of the present invention may further provide a graphical transition from the first representation of a program to the intermediate representation of the program to provide a visual cue indicative of the relationship between the first representation of the program and the intermediate representation of the program. As noted above, the first representations of programs may be obscured by the intermediate representation of a program or the first representations of programs surrounding the program that is launched may be repositioned to accommodate the intermediate representation of the launched program. Example embodiments of the graphical transition will be herein described with respect to first representations of programs being repositioned; however, it is appreciated that embodiments may also be implemented wherein first representations of programs surrounding the launched program remain in place and are obscured by the intermediate representation of the launched program.

In an example embodiment, a device, such as device 400 of FIG. 8 may receive a first input (e.g., via user interface 72) at a first representation of a first program, such as a tile 410 (e.g., for an email program) which corresponds to presentation of an intermediate representation. In response, tiles representing programs that surround the first program may be repositioned (e.g., by processor 70) away from the first representation of the first program to provide an area on the display 405 in which the intermediate representation may be presented. As noted above, the repositioning of the tiles representing other programs may be performed according to a hierarchy configured by the device or by the user. Optionally, the tiles representing other programs may use a dynamic animation as they are repositioned to other areas of the display 405 or moved off of the display 405. The dynamic animation may be a sliding, dragging, or other animation which illustrates the repositioning of the tiles representing other programs. Such an animation may provide a visual indicator to the user as to where the tiles are repositioned so as to preclude the user from later searching for a tile which had been repositioned.

Subsequent to, or concurrent with, the repositioning of the tiles representing other programs, the tile representing the first program 410 may begin the graphical transition from the tile to the intermediate representation. The graphical transition may resemble the physical manipulation of a tangible object. Example embodiments of physical manipulations of tangible objects may include the unfolding of a piece of paper, where the unfolding is the manipulation and the piece of paper is the tangible object. Further examples may include a flower blooming where the tile of the program resembles a flower bud and the intermediate representation appears as the tile of the program "blooms" into a "flower." The graphical transition may provide a visual cue indicative of the relationship between the first representation of the program and the intermediate representation of the program. This visual cue may be particularly useful in example embodiments where the intermediate representation overlies other program tiles as a user may benefit from seeing a visual confirmation of the program tile which is transitioning to the intermediate representation.

FIG. 9 illustrates the example embodiment of FIG. 8 with the tile representing the first program (e.g., the first representation) "unfolding" to expand from occupying an area the size of the tile to an area approximately twice as large as the tile. The animation of the graphical transition is illustrated by arrow 415 which depicts the "unfolding" motion of the "piece of paper" 412. FIG. 10 illustrates the animation of the graphical transition as the "piece of paper" is "unfolded" again along arrow 415 to reach the size of the intermediate representation of the program. Once the tile completes the graphical transition to the size of the intermediate representation, the intermediate representation including the intermediate interaction level may be displayed, as shown in FIG. 6. Optionally, the intermediate representation may be displayed on the "piece of paper" 412 as it is being "unfolded" providing an additional visual cue to the user of the relationship between the first representation of the program and the intermediate representation of the program.

FIGS. 11-13 illustrate another example embodiment of a first representation of a a program 440 transitioning graphically from a tile to an intermediate representation of the program where the graphical transition resembles a piece of paper unfolding. The tile may initially "unfold" as shown by arrow 442 in FIG. 11. The tile may then further unfold along arrow 444 as shown in FIG. 12. The tile may still further unfold along arrow 446 as illustrated in FIG. 13 to achieve the size of an intermediate representation of the program. While the embodiments illustrated in FIGS. 9-10 and 11-13 depict relatively accurate representations of a piece of paper unfolding as the graphical transition, further embodiments may resemble a piece of paper unfolding while using exaggerations afforded by the device and the display. For example, the unfolding of the piece of paper may not be entirely accurate or replicable by an actual piece of paper being unfolded. The tile may be stretched and unfolded or enlarged on the display as it appears to be unfolding such that the effect may only appear to resemble a piece of paper unfolding.

Example embodiments of the present invention may further reposition a first representation of a program in response to receiving an input (e.g., via user interface 72) for said program to transition to an intermediate representation. For example, a first representation of a program that is depicted in a lower corner of a display may be moved (e.g., by processor 70) to another, more visible portion of the display prior to, or in concert with a graphical transition to an intermediate representation of the program. In such an embodiment, first representations of other programs may be repositioned to accommodate the intermediate representation of the program.

As noted above, when a program is launched to an intermediate representation of the program from a first representation, a user may subsequently wish to transition from the intermediate representation to the second representation of the program, or the user may wish to close the displayed intermediate representation. In response to a user closing the program from the intermediate representation, a graphical transition may be provided from the presentation of the intermediate representation to the first representation of the program. The graphical transition may be substantially a reversal of the graphical transition with which the tile representing the program transitioned from the first representation to the intermediate representation of the program. For example, the graphical transition from the intermediate representation to the first representation of the program may resemble the folding of a piece of paper. The transition may be substantially a reversal of the unfolding effect shown in FIGS. 9-10 and 11-13.

In some example embodiments, as a user launches a program to the second representation from the intermediate representation, a graphical transition may be used to provide a visual cue to the user indicative of the relationship between the intermediate representation and the second representation of the program. The graphical transition may resemble the graphical transition from the first representation of the program to the intermediate representation of the program for continuity. Further, a graphical transition may be provided for transitioning from the second representation of the program to the first representation, or from the first representation directly to the second representation of the program.

FIGS. 14 and 15 are flowcharts of methods and program products according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 14, may include providing for display of a first representation of a first program at 500. The first representation may include a first interaction level. The method may also provide for display of an intermediate representation of the first program at 510, where the intermediate representation includes an intermediate interaction level and is presented in response to receiving a first input. At 520, the method may provide for display of a second representation of the first program where the second representation includes a second interaction level, and where the second representation is presented in response to receiving a second input, where the second input is different from the first input.

Another method according to an example embodiment of the present invention, as shown in FIG. 15, may include providing for display of representing first representation of a first program including a first interaction level at 600. At 610, a first graphical transition from the first representation of the first program to an intermediate representation of the first program may be presented in response to receiving a first input, where the first graphical transition provides a visual cue indicative of the relationship between the first representation of the first program and the intermediate representation of the first program. The first graphical transition may resemble a physical manipulation of a tangible object. At 620, the intermediate representation may be displayed where the intermediate representation includes an intermediate interaction level including a plurality of discrete interactive elements.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. With reference to the method of FIG. 14, in some example embodiments, the intermediate representation of the first program may be presented in a first size that is larger than the first representation of the first program. The second representation may be presented in a size that is larger than the size of the intermediate representation. The method may also include providing for display of a plurality of first representations of a plurality of other programs concurrently with the display of the first representation of the first program and repositioning at least one of the plurality of first representations of a plurality of other programs in response to display of the intermediate representation of the first program. The intermediate interaction level may include a first plurality of discrete interactive elements and the second interaction level may include a second plurality of discrete interactive elements, where the first plurality of discrete interactive elements is a subset of the second plurality of discrete interactive elements. The intermediate interaction level may include a first set of information and the second interaction level may include a second set of information, where the first set of information is a subset of the second set of information.

The method of FIG. 14 may further include providing for display of a first representation of a second program and providing for display of an intermediate representation of the second program including an intermediate interaction level with the second program in response to a third input, where the intermediate representation of the second program is displayed concurrently with the intermediate representation of the first program.

With reference to the method of FIG. 15, in some example embodiments, the physical manipulation of a tangible object may include unfolding of a piece of paper. The intermediate representation of the program may be larger than the first representation of the program and the method may include providing for display of a plurality of first representations of a plurality of other programs and repositioning at least one of the plurality of first representations of the plurality of other programs in response to the intermediate representation of the program being displayed. The method may include providing for a second graphical transition from the intermediate representation of the program to the first representation of the program in response to a second input. The second graphical transition may include a reversal of the first graphical transition. The intermediate interaction level of the intermediate representation of the program may be greater than the first interaction level of the first representation of the program. The method may include providing for a second graphical transition from the intermediate representation of the program to a second representation of the program in response to receiving a second input, where the second graphical transition provides a second visual cue indicative of a relationship between the intermediate representation of the program and the second representation of the program, and where the second graphical transition may resemble a physical manipulation of a tangible object.

In an example embodiment, an apparatus for performing the method of FIGS. 14 and 15 above may comprise a processor (e.g., the processor 70) configured to perform some or each of the operations (500-520 and/or 600-620) described above. The processor 70 may, for example, be configured to perform the operations (500-520 and/or 600-620) by performing hardware implemented logical functions, executing stored instructions, or executing algorithms for performing each of the operations. Alternatively, the apparatus may comprise means, such as the processor or the like, for performing each of the operations described above.

An example of an apparatus according to an example embodiment may include at least one processor and at least one memory including computer program code. The at least one memory and the computer program code may be configured to, with the at least one processor, cause the apparatus to perform the operations 500-520 and/or 600-620 (with or without the modifications and amplifications described above in any combination).

An example of a computer program product according to an example embodiment may include at least one computer-readable storage medium having computer-executable program code portions stored therein. The computer-executable program code portions may include program code instructions for performing operations 500-520 and/or 600-620 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing for concurrent display of a first representation of a first program, a first representation of a second program, and a first representation of a third program in a graphical user interface, wherein the first representation of the first program comprises a first interaction level with the first program and the first representation of the second program comprises a first interaction level with the second program;
determining whether a first input or a second input is provided at the first representation of the first program by a user, the second input being different from the first input, wherein:
in response to receiving the first input at the first representation of the first program from the user, an intermediate representation of the first program is displayed concurrently with the first representation of the second program and the first representation of the third program, the intermediate representation of the first program being greater in size than the first representation of the first program and comprising an intermediate interaction level with the first program, wherein the intermediate interaction level comprises a first plurality of discrete interactive elements for interaction with the first program and the intermediate interaction level is greater than the first interaction level, and wherein the intermediate representation of the first program occupies a space in the graphical user interface that was at least partially occupied by the first representation of the third program prior to display of the intermediate representation of the first program, and in response to display of the intermediate representation of the first program the first representation of the third program is re-positioned on a first occasion so that the intermediate representation of the first program does not obscure the first representation of the third program;

in response to receiving the second input at the first representation of the first program from the user, a second representation of the first program is displayed, wherein the second representation of the first program comprises a second interaction level with the first program and the second interaction level comprises a second plurality of discrete interactive elements for interaction with the first program, wherein the first plurality of discrete interactive elements is a subset of the second plurality of discrete interactive elements and the second interaction level is greater than the intermediate interaction level; and determining whether a third input or a fourth input is provided at the first representation of the second program by the user while the first representation of the second program is displayed concurrently with the intermediate representation of the first program and the first representation of the third program, the third input being different from the fourth input, wherein:

in response to receiving the third input at the first representation of the second program from the user, an intermediate representation of the second program is displayed concurrently with the intermediate representation of the first program and the first representation of the third program, the intermediate representation of the second program being greater in size than the first representation of the second program and comprising an intermediate interaction level with the second program, wherein the intermediate interaction level comprises a first plurality of discrete interactive elements for interaction with the second program and the intermediate interaction level is greater than the first interaction level, and wherein the intermediate representation of the second program occupies a space in the graphical user interface that was at least partially occupied by the first representation of the third program prior to display of the intermediate representation of the second program, and in response to display of the intermediate representation of the second program the first representation of the third program is re-positioned on a second occasion so that the intermediate representation of the second program does not obscure the first representation of the third program;

in response to receiving the fourth input at the first representation of the second program from the user, a second representation of the program is displayed, wherein the second representation of the second program comprises a second interaction level with the second program and the second interaction level comprises a second plurality of discrete interactive elements for interaction with the second program, wherein the first plurality of discrete interactive elements is a subset of the second plurality of discrete interactive elements and the second interaction level is greater than the intermediate interaction level.

2. The method of claim 1, wherein the second representation of the first program is presented in a size that is larger than the size of the intermediate representation of the first program.

3. The method of claim 1, wherein the intermediate interaction level comprises a first set of information and wherein the second interaction level comprises a second set of information and wherein the first set of information is a subset of the second set of information.

4. The method of claim 1, wherein the first representation of the third program is:
re-positioned along both a first axis and a second axis, perpendicular to the first axis, on at least one of the first occasion and the second occasion.

5. The method of claim 1, wherein the first representation of the third program and a first representation of a fourth program are re-positioned based on a user selected ranking.

6. The method of claim 1, wherein the second interaction level of the first program is a fully functional interaction level where the first program is running at full capacity, and the second interaction level of the second program is a fully functional interaction level where the second program is running at full capacity.

7. The method of claim 1, wherein the first representation of the third program and a first representation of a fourth program are re-positioned based on frequency of use of the third program and the fourth program.

8. The method of claim 1, further comprising: in response to receiving the first input at the first representation of the first program from the user, providing a graphical transition in which the first representation of the first program transitions into the intermediate representation of the first program by expanding into the space in the optical user interface that was at least partially occupied by the first representation of the third program and providing an animation including a visual indicator as to where the first representation of the third program is re-positioned on the first occasion.

9. The method of claim 8, further comprising: in response to receiving the third input at the first representation of the second program from the user, providing a graphical transition in which the first representation of the second program transitions into the intermediate representation of the second program by expanding into the space in the graphical user interface that was at least partially occupied by the first representation of the third program and providing an animation including a visual indicator as to where the first representation of the third program is re-positioned on the second occasion.

10. An apparatus comprising at least one processor and at least one memory including computer program code, the at least one memory and the computer program code configured to, with the at least one processor, cause the apparatus to:
provide for concurrent display of a first representation of a first program, a first representation of a second program, and a first representation of a third program in a graphical user interface, wherein the first representation of the first program comprises a first interaction level with the first program and the first representation of the second program comprises a first interaction level with the second program;

determine whether a first input or a second input is provided at the first representation of the first program by a user, the second input being different from the first input, wherein:

in response to receiving the first input at the first representation of the first program from the user, an intermediate representation of the first program is displayed concurrently with the first representation of the second program and the first representation of the third program, the intermediate representation of the first program being greater in size than the first representation of the first program and comprising an intermediate interaction level with the first program, wherein the intermediate interaction level comprises a first plurality of discrete interactive elements for interaction with the first program and the intermediate interaction level is greater than the first interaction level, and wherein the intermediate representation of the first program occupies a space in the graphical user interface that was at least partially occupied by the first representation of the third program prior to display of the intermediate representation of the first program, and in response to display of the intermediate representation of the first program the first representation of the third program is re-positioned on a first occasion so that the intermediate representation of the first program does not obscure the first representation of the third program;

in response to receiving the second input at the first representation of the first program from the user, a second representation of the first program is displayed, wherein the second representation of the first program comprises a second interaction level with the first program and the second interaction level comprises a second plurality of discrete interactive elements for interaction with the first program, wherein the first plurality of discrete interactive elements is a subset of the second plurality of discrete interactive elements and the second interaction level is greater than the intermediate interaction level; and determine whether a third input or a fourth input is provided at the first representation of the second program by the user while the first representation of the second program is displayed concurrently with the intermediate representation of the first program and the first representation of the third program, the third input being different from the fourth input, wherein:

in response to receiving the third input at the first representation of the second program from the user, an intermediate representation of the second program is displayed concurrently with the intermediate representation of the first program and the first representation of the third program, the intermediate representation of the second program being greater in size than the first representation of the second program and comprising an intermediate interaction level with the second program, wherein the intermediate interaction level comprises a first plurality of discrete interactive elements for interaction with the second program and the intermediate interaction level is greater than the first interaction level, and wherein the intermediate representation of the second program occupies a space in the graphical user interface that was at least partially occupied by the first representation of the third program prior to display of the intermediate representation of the second program, and in response to display of the intermediate representation of the second program the first representation of the third program is re-positioned on a second occasion so that the intermediate representation of the second program does not obscure the first representation of the third program;

in response to receiving the fourth input at the first representation of the second program from the user, a second representation of the second program is displayed, wherein the second representation of the second program comprises a second interaction level with the second program and the second interaction level comprises a second plurality of discrete interactive elements for interaction with the second program, wherein the first plurality of discrete interactive elements is a subset of the second plurality of discrete interactive elements and the second interaction level is greater than the intermediate interaction level.

11. The apparatus of claim 10, wherein the second representation of the first program is presented in a size that is larger than the size of the intermediate representation of the first program.

12. The apparatus of claim 10, wherein the intermediate interaction level comprises a first set of information and wherein the second interaction level comprises a second set of information and wherein the first set of information is a subset of the second set of information.

13. The apparatus of claim 10, wherein the second interaction level of the first program is a fully functional interaction level where the first program is running at full capacity, and the second interaction level of the second program is a fully functional interaction level where the second program is running at full capacity.

14. The apparatus of claim 10, wherein the computer program code is configured to, with the at least one processor, cause the apparatus to: in response to receiving the first input at the first representation of the first program from the user, provide a graphical transition in which the first representation of the first program transitions into the intermediate representation of the first program by expanding into the space in the graphical user interface that was at least partially occupied by the first representation of the third program and provide an animation including a visual indicator as to where the first representation of the third program is re-positioned on the first occasion.

15. The apparatus of claim 14, wherein the computer program code is configured to, with the at least one processor, cause the apparatus to: in response to receiving the third input at the first representation of the second program from the user, provide a graphical transition in which the first representation of the second program transitions into the intermediate representation of the second program by expanding into the space in the graphical user interface that was at least partially occupied by the first representation of the third program and provide an animation including a visual indicator as to where the first representation of the third program is re-positioned on the second occasion.

16. A computer program product comprising at least one non-transitory computer-readable storage medium having computer executable program code instructions stored therein, the computer executable program code instructions being configured, when performed by at least one processor, to cause:

providing for concurrent display of a first representation of a first program, a first representation of a second program, and a first representation of a third program in a graphical user interface, wherein the first representation of the first program comprises a first interaction level with the first program and the first representation of the second program comprises a first interaction level with the second program;

determining whether a first input or a second input is provided at the first representation of the first program by a user, the second input being different from the first input, wherein:

in response to receiving the first input at the first representation of the program from the user, an intermediate representation of the first program is displayed concurrently with the first representation of the second program and the first representation of the third program, the intermediate representation of the first program being greater in size than the first representation of the first program and comprising an intermediate interaction level with the first program, wherein the intermediate interaction level comprises a first plurality of discrete interactive elements for interaction with the first program and the intermediate interaction level is greater than the first interaction level, and wherein the intermediate representation of the first program occupies a space in the graphical user interface that was at least partially occupied by the first representation of the third program prior to display of the intermediate representation of the first program, and in response to display of the intermediate representation of the first program the first representation of the third program is re-positioned on a first occasion so that the intermediate representation of the first program does not obscure the first representation of the third program; and in response to receiving the second input at the first representation of the first program from the user, a second representation of the first program is displayed, wherein the second representation comprises a second interaction level with the first program and the second interaction level comprises a second plurality of discrete interactive elements for interaction with the first program, wherein the first plurality of discrete interactive elements is a subset of the second plurality of discrete interactive elements and the second interaction level is greater than the intermediate interaction level; and determining whether a third input or a fourth input is provided at the first representation of the second program by the user while the first representation of the second program is displayed concurrently with the intermediate representation of the first program and the first representation of the third program, the third input being different from the fourth input, wherein:

in response to receiving the third input at the first representation of the second program from the user, an intermediate representation of the second program is displayed concurrently with the intermediate representation of the first program and the first representation of the third program, the intermediate representation of the second program being greater in size than the first representation of the second program and comprising an intermediate interaction level with the second program, wherein the intermediate interaction level comprises a first plurality of discrete interactive elements for interaction with the second program and the intermediate interaction level is greater than the first interaction level, and wherein the intermediate representation of the second program occupies a space in the graphical user interface that was at least partially occupied by the first representation of the third program prior to display of the intermediate representation of the second program, and in response to display of the intermediate representation of the second program the first representation of the third program is re-positioned on a second occasion so that the intermediate representation of the second program does not obscure the first representation of the third program;

in response to receiving the fourth input at the first representation of the second program from the user, a second representation of the second program is displayed, wherein the second representation of the second program comprises a second interaction level with the second program and the second interaction level comprises a second plurality of discrete interactive elements for interaction with the second program, wherein the first plurality of discrete interactive elements is a subset of the second plurality of discrete interactive elements and the second interaction level is greater than the intermediate interaction level.

17. The computer program product of claim 16, wherein the second representation of the first program is presented in a size that is larger than the size of the intermediate representation of the first program.

18. The computer program product of claim 16, wherein the second interaction level of the first program is a fully functional interaction level where the first program is running at full capacity, and the second interaction level of the second program is a fully functional interaction level where the second program is running at full capacity.

19. The computer program product of claim 16, wherein the computer executable program code instructions are configured, when performed by at least one processor, to cause: in response to receiving the first input at the first representation of the first program from the user, providing a graphical transition in which the first representation of the first program transitions into the intermediate representation of the first program by expanding into the space in the graphical user interface that was at least partially occupied by the first representation of the third program and providing an animation including a visual indicator as to where the first representation of the third program is re-positioned on the first occasion.

20. The computer program product of claim 19, wherein the computer executable program code instructions are configured, when performed by at least one processor, to cause: in response to receiving the third input at the first representation of the second program from the user, providing a graphical transition in which the first representation of the second program transitions into the intermediate representation of the second program by expanding into the space in the graphical user interface that was at least partially occupied by the first representation of the third program and providing an animation including a visual indicator as to where the first representation of the third program is re-positioned on the second occasion.

* * * * *